United States Patent [19]

Bradburne

[11] 3,882,226
[45] May 6, 1975

[54] INSECTICIDAL COMPOSITION EMPLOYING DDVP

[76] Inventor: Francis Edward Husband Bradburne, Shaw Street Works, Lancashire, Blackburn, England

[22] Filed: Oct. 5, 1972

[21] Appl. No.: 295,271

Related U.S. Application Data

[63] Continuation-in-part of Ser. No. 37,571, May 15, 1970, abandoned.

[30] Foreign Application Priority Data

Feb. 12, 1970 United Kingdom............ 26970/69

[52] U.S. Cl. ................ 424/19; 424/219; 424/332; 424/350; 424/355
[51] Int. Cl. ...................... A01n 9/36; A01n 17/00
[58] Field of Search ............ 424/219, 19, 357, 332, 424/350, 355

[56] References Cited
UNITED STATES PATENTS
3,364,105   1/1968   Geiger et al. .................... 424/357

FOREIGN PATENTS OR APPLICATIONS
1,010,191   11/1965   United Kingdom

*Primary Examiner*—V. D. Turner
*Attorney, Agent, or Firm*—Emory L. Groff, Jr.

[57] ABSTRACT

An insecticidal material comprising a porous ceramic carrier impregnated with a liquid mixture of 2,2-dichlorovinyl dimethyl phosphate and hexachloroethane, naphthalene, camphor and quinone.

1 Claim, 1 Drawing Figure

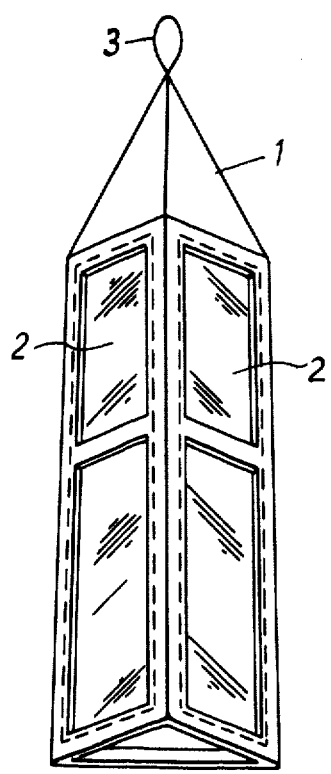

INSECTICIDAL COMPOSITION EMPLOYING DDVP

The present Application is a Continuation-in-Part application of my application Ser. No. 37,571 filed May 15th 1970, now abandoned.

THE PRIOR ART

Insecticidal compositions are known which are functional as general insect poisons on contact, by ingestion or by inhalation and have been widely used as sprays, dusts or baits. Insecticides such as 2,2 dichlorovinyl dimethyl phosphate (hereinafter referred to as DDVP) are known for use in such compositions. DDVP has a relatively high vapour pressure and whilst generally stable under dry conditions readily hydrolyses when in contact with moisture. In view of these properties, which are disadvantageous in the use of this compound as an insecticide, various different forms of compositions containing DDVP have been proposed to enable it to be effectively dispensed. Thus it has been proposed to impregnate solid inert carrier materials such as cork, paper, wood, sawdust, cotton, vermiculite, clays or porous ceramics with compositions containing DDVP in order to increase its effective life of persistence and ability to be released to the surrounding atmosphere at a controlled rate. It has been found however that the use of such carrier materials tended to shorten the effective life of the compound and that also the carrier materials contained traces of water difficult to remove or absorbed moisture from the atmosphere, resulting in the degradation of the DDVP generally thought to be due to hydrolysis.

It is also known from British Patent specification No. 1,010,191 (Shell Internationale Research Maatschappij N.V.) to provide a solid insecticidal composition comprising camphor in which has been incorporated up to 10 percent of 2,2 dichlorovinyl dimethyl phosphate. In respect of this composition however it has been found that although providing acceptable insecticidal activity the activity is not maintained for a length of time necessary for a commercially viable product.

It is an object of the present invention to provide an insecticidal material which substantially overcomes any of the aforesaid disadvantages. Other objects of the invention will become apparent from the description hereafter.

SUMMARY OF THE INVENTION

According to the present invention there is provided an insecticidal material comprising a porous ceramic carrier impregnated with a liquid mixture of a 2,2 dichlorovinyl dimethyl phosphate (DDVP) and from about 5 to about 20 percent by weight of a volatile water-insoluble substance selected from hexachloroethane, naphthalene, camphor or quinone based on the total weight of the mixture.

PREFERRED EMBODIMENTS OF THE INVENTION

The liquid mixture is absorbed upon the ceramic carrier, and in this form it is found that the water-insoluble substance acts as a "Waterproofing agent" for the insecticide preventing hydrolysis in the presence of moisture whilst at the same time, since it itself is volatile, allowing the insecticidal vapour to emerge from the carrier in a controlled manner. In this form the insecticidal material of the present invention finds application in domestic surroundings, in industrial premises, greenhouses, warehouses and storage places for foodstuffs, grains, cereals, etc.

The ceramic carrier may be a ceramic body preferably in the form of a plate. In practice these porous ceramic plates impregnated with the liquid mixture may be marketed in a vapour-proof package e.g. a heat sealed laminate of tinfoil and polythene and when required for use may be hung by a cord threaded through a hole in the material or be mounted in a suitable device or holder for example a lantern of the design illustrated in the accompanying drawing which shows a perspective view of a lantern of attractive design constructed to hold three rectangular ceramic plates.

Referring to the drawing a triangular lantern which may be fabricated of say cardboard and which may be folded flat when not in use carries three ceramic plates 2 one adjacent to each side of the lantern. A loop 3 of string or other suitable material is provided at the top of the lantern for carrying or suspending in a suitable position. The purpose of the lantern device is to present an adequate and predetermined area of surface to enable the volatilisation of the insecticidal composition to take plate at a rate suitable to the conditions under which it is to be employed.

SPECIFIC EMBODIMENT OF THE INVENTION

In order to demonstrate the invention the following samples were prepared and tested;

i Sample A a ceramic tile of dimensions 16.2 cm. × 5.4 cm. × 0.35 cm., impregnated to an extent of 23.2 percent of its dry weight with liquid mixture of 95 parts by weight DDVP and 5 parts by weight of camphor.

ii Sample B a ceramic tile of dimensions as in (i) above impregnated to an extent of 23.2 percent of its dry weight with a liquid mixture of 90 parts by weight DDVP and 10 parts by weight of camphor.

iii Sample C a ceramic tile of dimensions as in (i) above impregnated to an extent of 23.2 percent of its dry weight with a liquid mixture of 85 parts by weight of DDVP and 15 parts by weight of camphor.

iv Sample D a ceramic tile of dimensions as in (i) above impregnated to an extent of 23.2 percent of its dry weight with a liquid mixture of 95 parts by weight of DDVP and 5 parts by weight of naphthalene.

v Sample E a ceramic tile of dimensions as in (i) above impregnated to an extent of 23.2 percent of its dry weight with a liquid mixture of 90 parts by weight of DDVP and 10 parts by weight of naphthalene.

vi Sample F a ceramic tile of dimensions as in (i) above impregnated to an extent of 23.2 percent of its dry weight with a liquid mixture of 85 parts by weight of DDVP and 15 parts by weight of naphthalene.

The samples were subjected to the following test. Each sample was suspended from the ceiling of a 1,000 ft$^3$ room. The ceramic tiles were suspended by a thread through a small drilled hole, the cast block of Sample A was held in a nylon net sling.

The rooms were empty, unventilated and identical in shape. The temperature was maintained at a constant 80°F, the humidity was uncontrolled and was in the range of 50–60 percent during the test period.

Each device was weighed at intervals. The weight losses are given in the Table below.

| Time (Hours) | Weight loss of Samples (grams) | | | | | |
|---|---|---|---|---|---|---|
| | Sample A | Sample B | Sample C | Sample D | Sample E | Sample F |
| 0 | 61.28 | 62.07 | 59.36 | 63.40 | 60.96 | 60.46 |
| 5 | 61.11 | 61.80 | 58.94 | 63.18 | 60.67 | 60.06 |
| 30 | 60.34 | 60.66 | 57.57 | 62.40 | 59.66 | 58.85 |
| 57 | 59.62 | 59.73 | 56.62 | 61.64 | 58.89 | 57.97 |
| 80 | 59.02 | 59.09 | 56.00 | 61.07 | 58.34 | 57.39 |
| 101 | 58.55 | 58.56 | 55.47 | 60.59 | 57.86 | 56.91 |
| 125 | 58.09 | 58.06 | 54.96 | 60.13 | 57.42 | 56.43 |
| 149 | 57.57 | 57.52 | 54.41 | 59.60 | 56.89 | 55.89 |
| 173 | 57.16 | 57.08 | 53.96 | 59.11 | 56.39 | 55.38 |

The above tests show the surprising similarity between the camphor and naphthalene and show that even after 173 hours of test time little of the liquid mixture has evaporated from each sample. In all samples however the insecticidal activity of the samples after the test remained substantially unchanged.

I claim:

1. An insecticidal material comprising a porous ceramic carrier impregnated with at least an insecticidal amount of a liquid mixture of 2,2-dichlorovinyl dimethyl phosphate and from about 5 to about 20 percent by weight of a volatile water-insoluble substance selected from the group consisting of hexachloroethane, naphthalene and camphor based on the total weight of the mixture, the porosity of said ceramic carrier being sufficient to allow absorption thereby of an insecticidal amount of the liquid mixture.

* * * * *